3,454,402
Patented July 8, 1969

3,454,402
PHOTOGRAPHIC MATERIALS FOR THE SILVER DYESTUFF BLEACHING PROCESS
Walter Anderaú, Marly-le-Grand, Rudolf Mory, Dornach, and Bernhard Piller, Marly-le-Grand, Switzerland, assignors to Ciba Limited, Basel, Switzerland, a Swiss company
No Drawing. Filed Oct. 5, 1965, Ser. No. 493,269
Claims priority, application Switzerland, Oct. 8, 1964
13,108/64
Int. Cl. G03c 1/10
U.S. Cl. 96—99    7 Claims

ABSTRACT OF THE DISCLOSURE

Photographic material for the silver dyestuff bleaching process which contains in one layer silver halide and at least one dyestuff having a magenta tint. The dyestuff corresponds to the formula.

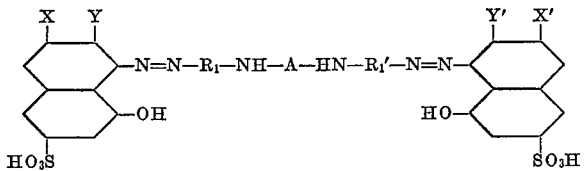

in which X and X' each represents a member selected from the group consisting of a hydrogen atom and a sulfonic acid group, Y and Y' each represents a member selected from the group consisting of a phenylamino group further substituted by alkyl groups in the two positions vicinal to the bond with the nitrogen atom, an alkylamino group a hydroxyalkylamino group having at least two carbon atoms and a cycloalkylamino group, $R_1$ and $R_1'$ each represents a cyclic radical containing at least one benzene ring to which the azo group is attached, and A represents a member selected from group consisting of the radical of the formula —CO— and the diacyl radicals of benzene-, thiophene- and furandicarboxylic acid and cyanuric acid. Dyestuffs of this type display advantageous absorption curves in respect of position and configuration, have a good water-solubility and are fast to diffusion.

---

The present invention provides photographic materials for the silver dyestuff bleaching process, which materials have specially valuable properties. They contain in one layer at least one dyestuff which, like the dyestuff of the formula (1)
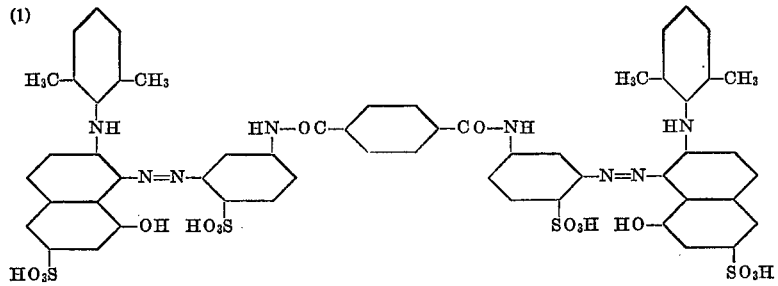

corresponds to the general formula (2)
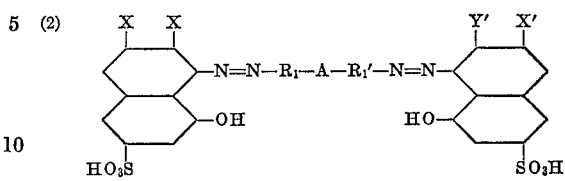

in which X and X' each represents a hydrogen atom or a sulfonic acid group, Y and Y' each represents an amino group, of which at least one is a secondary or tertiary amino group, $R_1$ and $R_1'$ each represents a cyclic radical containing at least one benzene ring to which the azo group is bound and A represents the radical of the diamide of a carbon-containing acid which is at least dibasic, which residue is bound to $R_1$ and $R_1'$ through the nitrogen atoms.

The dyestuffs of the Formula 2 can be prepared in known manner. An advantageous procedure is to couple a diazo compound of the benzene series which contains an $H_2N$— group and which does not couple with itself or a diazo compound of the benzene series which contains a group convertible into an $H_2N$— group, with an aminohydroxynaphthalene sulfonic acid of the formula (3)
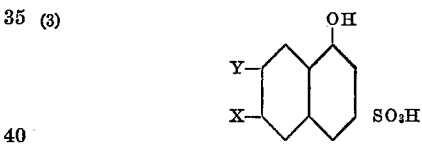

in which X and Y have the meanings given above, and if necessary, after conversion of the above-mentioned group into the $H_2N$— group, to condense the aminomonoazo dyestuff in a molecular ratio of 2:1 with a halide of a carbon-containing acid which is at least dibasic. In order to increase the size of the dyestuff molecule, it is

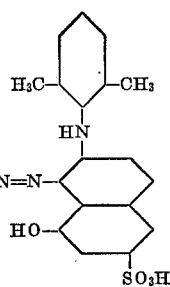

possible first to acylate the aminomonoazo dyestuff with a nitrobenzenemonocarboxylic acid halide, to reduce the nitro compound to an amino compound, and only then to condense the aminoazo dyestuff with the halide of the polybasic acid.

Coupling components to be used in the manufacture of the dyestuffs are therefore 2-amino-8-hydroxynaphthalene-3,6-disulfonic acids or preferably 2-amino-8-hydroxynaphthalene-6-sulfonic acids having an amino group that is further substituted. If the amino group is further substituted by a phenyl radical, the latter must contain a substituent, for example, a methyl group or a chlorine atom, at both positions vicinal to the bond with the nitrogen atom. The amino group may also be a monoalkyl or dialkyl amino group, a (mono- or di-hydroxyalkyl)-amino group or an alkyl-hydroxy-alkyl-amino group, which aliphatic, further-substituted amino groups contain at least 2 carbon atoms. Also suitable are cycloalkylamino groups, for example the cyclohexylamino group. The following compounds may be mentioned as examples of coupling components:

2-(2',6'-dimethylphenylamino)-8-hydroxynaphthalene-6-sulfonic acid,
2-(2',6'-diethylphenylamino)-8-hydroxynaphthalene-6-sulfonic acid,
2-(2',4',6'-trimethylphenylamino)-8-hydroxynaphthalene-6-sulfonic acid,
2-(2',3',4',6'-tetramethylphenylamino)-8-hydroxynaphthalene-6-sulfonic acid,
2-dimethylamino-8-hydroxynaphthalene-6-sulfonic acid,
2-diethylamino-8-hydroxynaphthalene-6-sulfonic acid,
2-β-hydroxyethylamino-8-hydroxynaphthalene-6-sulfonic acid,
2-di-(β-hydroxyethylamino)-8-hydroxynaphthalene-6-sulfonic acid,
2-n-butylamino-8-hydroxynaphthalene-6-sulfonic acid,
2-cyclohexylamino-8-hydroxynaphthalene-6-sulfonic acid, and
2-(2',6'-dimethylphenylamino)-8-hydroxynaphthalene-3,6-di-sulfonic acid.

The above-mentioned coupling components are coupled with diazo compounds of the benzene series of the constitution indicated, after which it may be necessary to convert the product into an amino compound, for example, by reduction of a nitro group or hydrolysis of an acylamino group. Thus, for example, monoazo dyestuffs may be prepared whose radicals derived from the diazo components correspond to the formula (4) 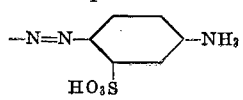

(5) 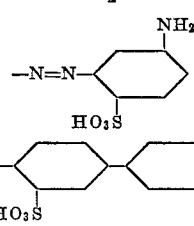

(6) 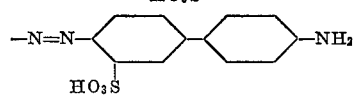

The aminomonoazo dyestuffs obtained in the manner indicated or the aminobenzoylamino compounds obtained by acylating the acid dyestuffs with, for example, meta- or para-nitrobenzoyl chloride and subsequent reduction are condensed, for example, with the following halides of carbon-containing acids which are at least dibasic: benzene-1,3-dicarboxylic acid dichloride, benzene-1,4-dicarboxylic acid dichloride, diphenyl-(1,1')-4,4'-dicarboxylic acid dichloride, furan-2,5-dicarboxylic acid dichloride, thiophene-2,5-dicarboxylic acid dichloride, phosgene (dichloride of carbonic acid) and cyanuric chloride (trichloride of cyanuric acid). Symmetrical dyestuffs are obtainable as well as asymmetrical dyestuffs, especially with cyanuric chloride.

All the reactions involved in the manufacture of the dyestuffs of the Formula 2 can be carried out in known manner. As has been indicated in the foregoing, dyestuffs that are particularly suitable for the purpose in question are:

(I) Dyestuffs of the Formula 2, in which X, X', R₁, R₁' and A have the meanings given above and Y and Y' represent amino groups, of which at least one is a phenylamino group further substituted in the phenyl radical at the two positions vicinal to the bond with the nitrogen atom.

Dyestuffs of the kind defined that are worthy of special mention are those of the formula (7) 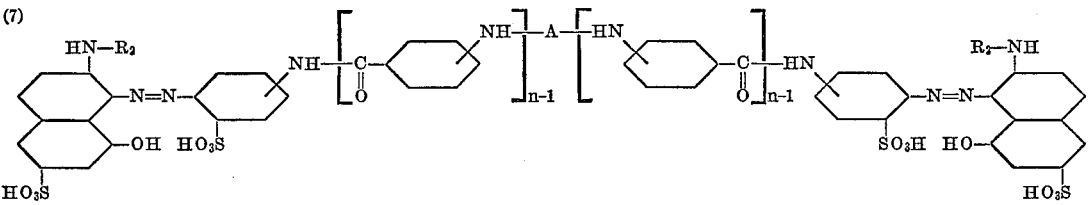

in which R₂ represents a phenylamino group further substituted in the phenyl radical at least in the two positions vicinal to the bond with the nitrogen atom,

—NH—A—HN— represents the radical of the diamide of a carbon-containing acid that is at least dibasic and n represents an integer not greater than 2. This applies in particular to dyestuffs of the formula (8) 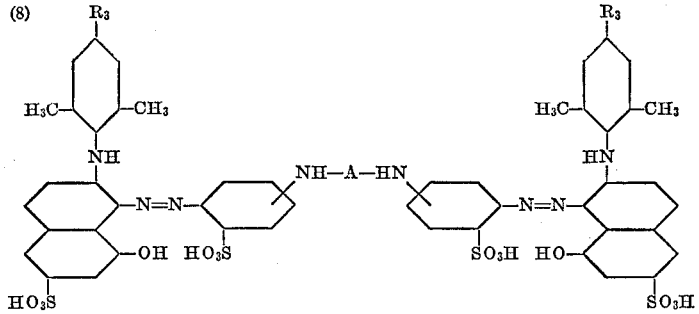

in which —NH—A—HN— has the meaning given above and R₃ represents a hydrogen atom or a methyl group.

(II) Dyestuffs of the Formula 2, in which X, X', R₁, R₂ and A have the meanings given above and Y and Y' represent amino groups, of which at least one is an alkylamino or hydroxyalkylamino group having at least two carbon atoms or a cycloalkylamino group, especially the dyestuffs of the formula (9)

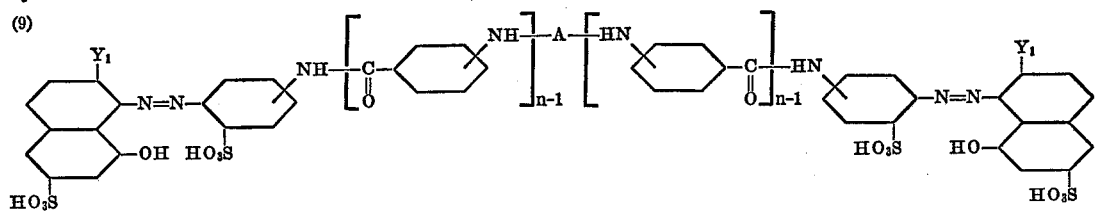

in which $Y_1$ represents an alkylamino or hydroxyalkylamino group having at least two carbon atoms or a cycloalkylamino group, —NH—A—HN— represents the residue of the diamide of a carbon-containing acid that is at least diabasic and $n$ represents an integer not greater than 2.

Like the dyestuffs themselves, the photographic layers which, in accordance with the invention, contain at least one dyestuff of the Formula 2, may be prepared in known manner and used for the production of color images. The dyestuffs of the Formula (2) generally have a magenta tint in the gelatine, and they may advantageously be present in the green-sensitized silver halide-gelatine emulsion layer in multilayer material, which material also contains a red-sensitized cyan emulsion layer and a yellow emulsion layer that has not been specially sensitized.

The layer dyestuffs of the Formula 2 display very advantageous behaviour in the silver dyestuff bleaching process. Their absorption curves are advantageous in respect of position and configuration, the maxima being within the desired range and subsidiary absorption being minimal. Notwithstanding their good solubility in water, most of the dyestuffs diffuse only very slightly. The dyestuffs which are specially resistant to diffusion are those of the Formulae 20 to 25. In cases where additives are required to prevent diffusion completely, for example, guanidines, the said additives do not impair the fastness to light of the dyestuffs of the Formula 2 to be used in accordance with the invention.

All the magenta dyestuffs listed in the following and which correspond to the general Formula 2 may be manufactured by the methods described above:

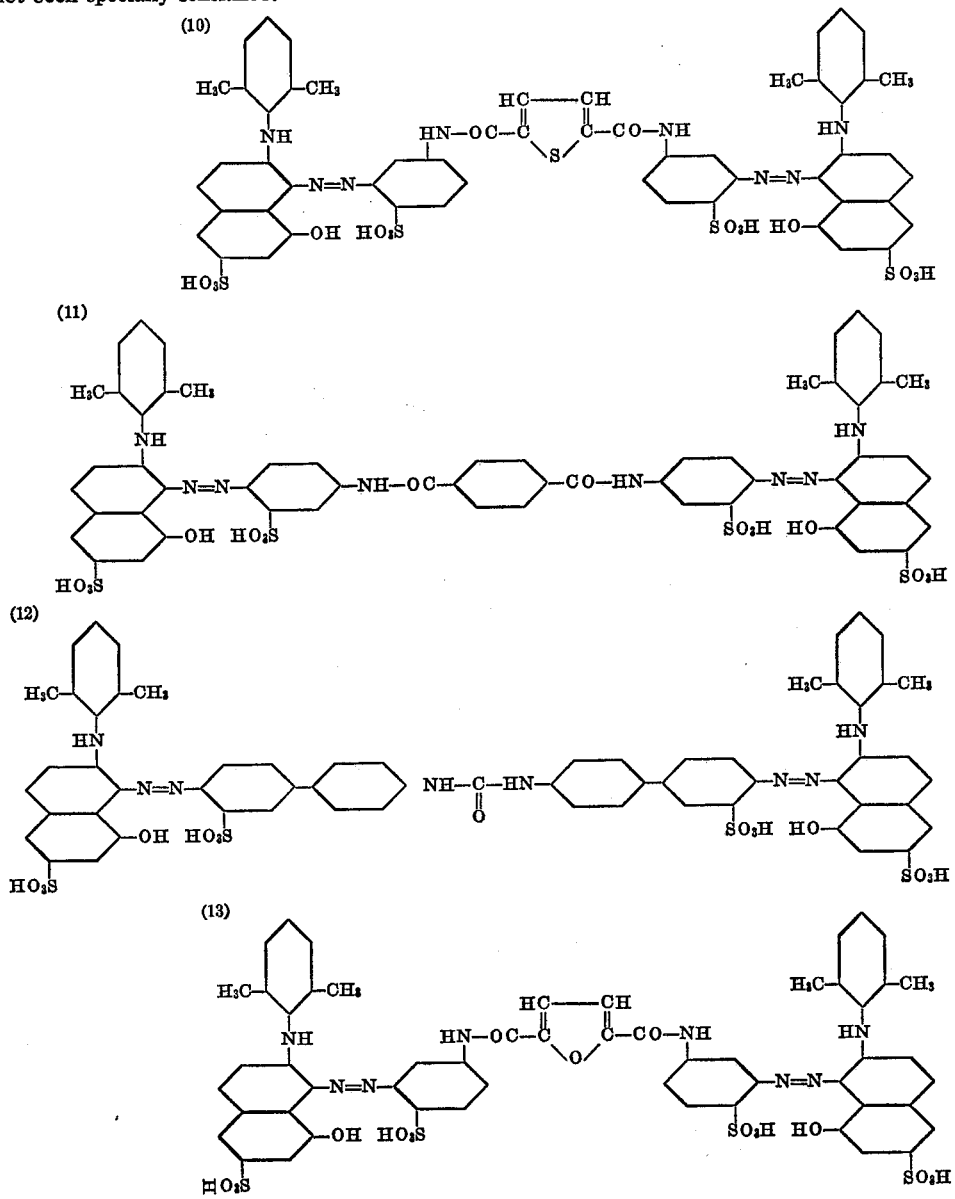

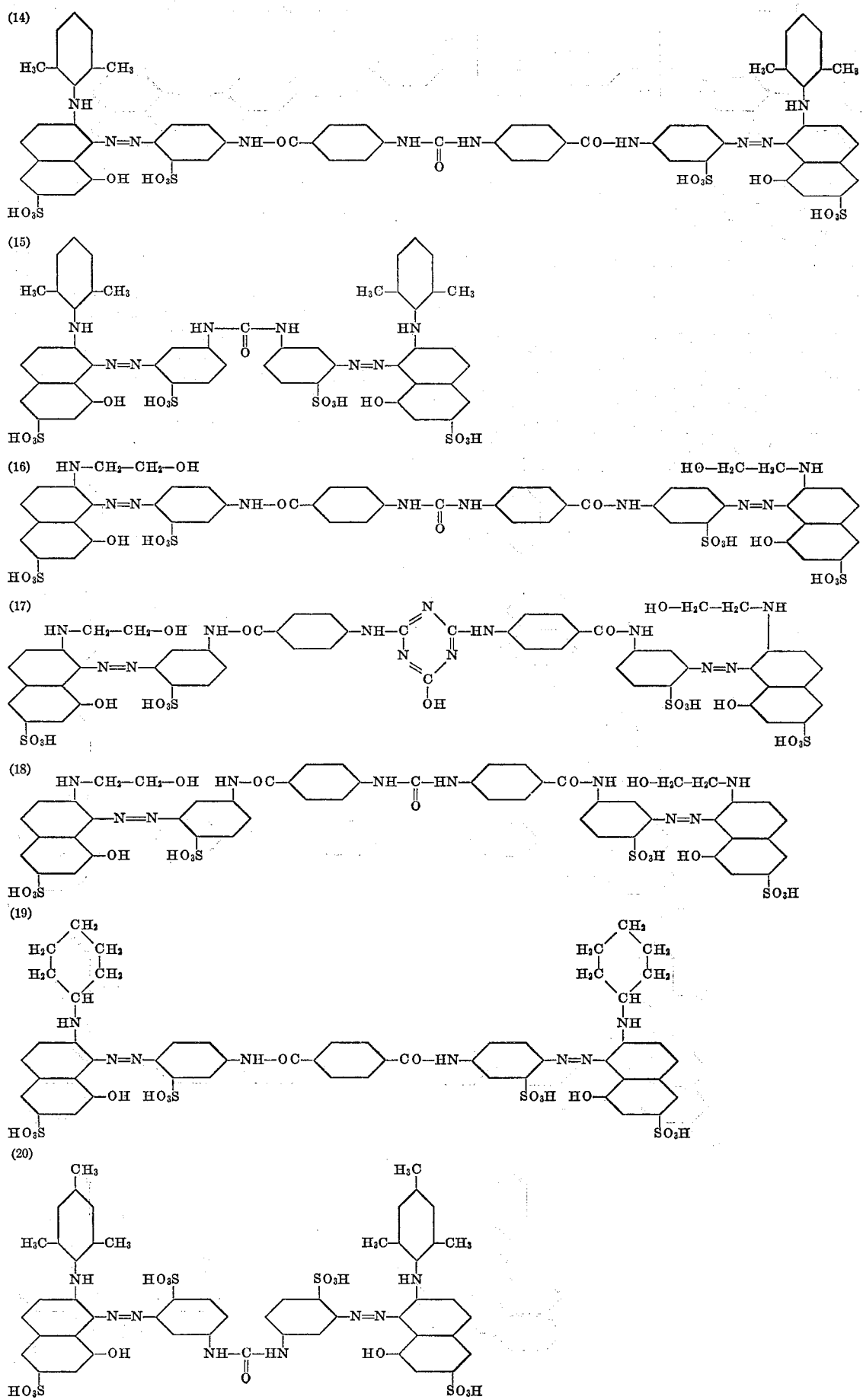

(21) 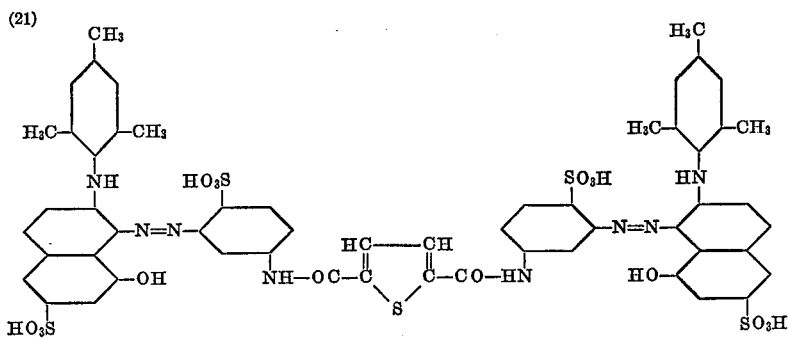
(22) 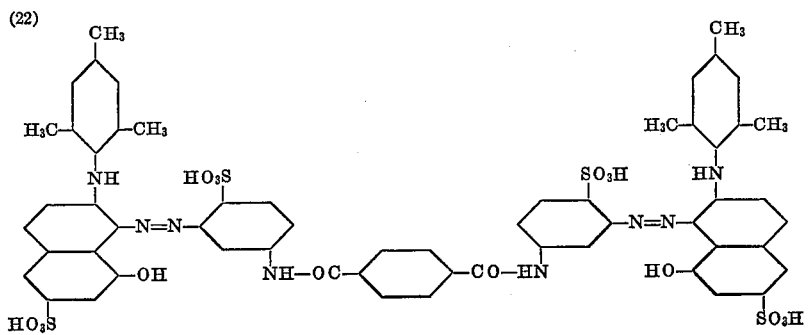
(23) 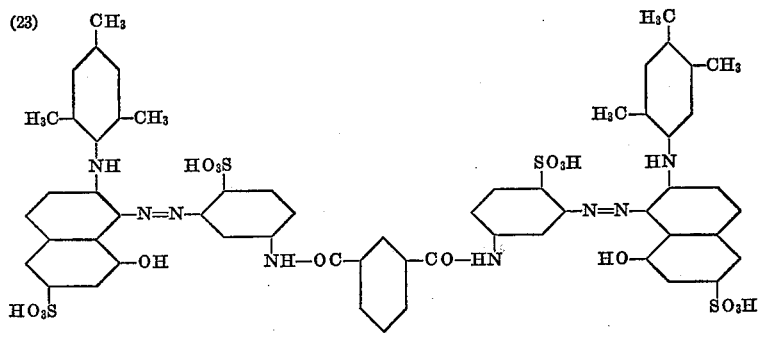
(24) 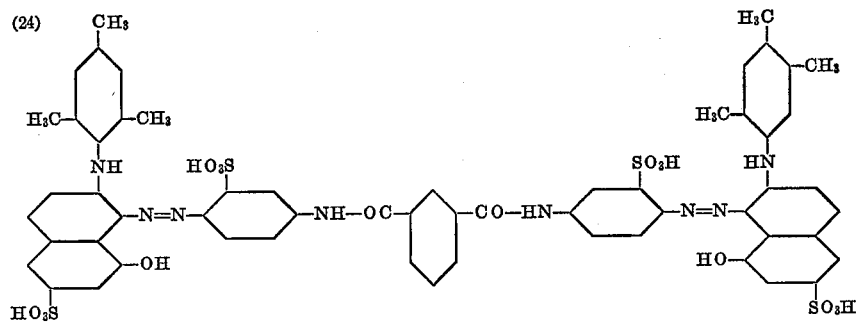
(25) 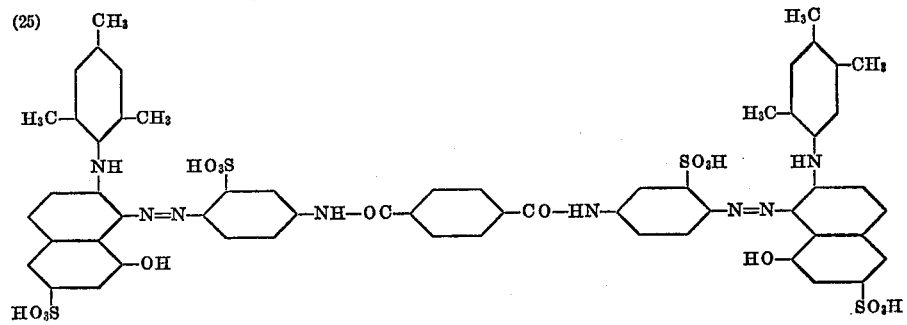

The following table shows how the position and configuration of the dyestuff absorption curve can be changed by the choice of bridging groups, coupling component and diazo component $R_1$.

| Dyestuff of the formula: | Absorption maximum [1] $m\mu$ |
|---|---|
| 1 | 562 |
| 11 | 570 |
| 14 | 575 |
| 20 | 552 |
| 21 | 564 |
| 22 | 569 |
| 23 | 562 |
| 24 | 570–580 |
| 25 | 580 |

[1] Measurements made when the dyestuff is dissolved in gelatine.

EXAMPLE

The following layers are applied in the sequence indicated to a substrated white, opaque acetate film:

(1) A red-sensitized silver bromide emulsion in gelatine which contains the cyan dyestuff of the formula

(26)
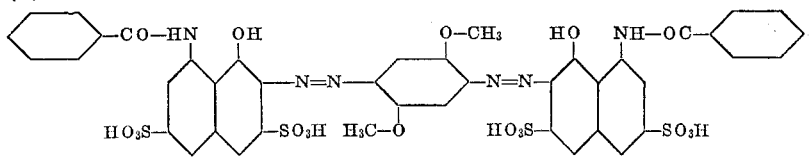

(2) A colorless gelatine layer without silver halide.
(3) A green-sensitized silver bromide emulsion in gelatine which contains the magenta dyestuff of the Formula 1.
(4) A yellow filter layer which contains the dyestuff of the formula

(27)
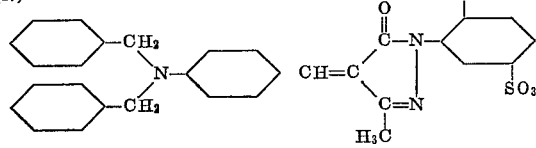

(5) A blue-sensitized silver bromide emulsion in gelatine which contains the yellow dyestuff of the formula

(28)
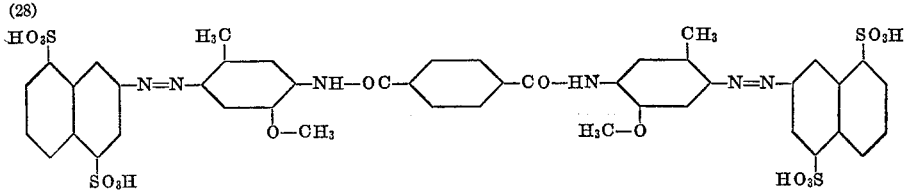

The gelatine layers may also contain additives, for example, wetting agents, hardening agents and stabilizers for the silver halide. The quantities of materials used are such that each layer contains 0.5 gram of dyestuff and silver bromide corresponding to 1 to 1.2 grams of silver per square meter of film.

The film so prepared is exposed beneath a colored diapositive to red, green and blue light. The reproduction is then developed in the following manner:

(1) Development for 6 minutes in a bath containing, per liter of water, 50 grams of anhydrous sodium sulfate, 0.2 gram of 1-phenyl-3-pyrazolidone, 6 grams of hydroquinone, 35 grams of anhydrous sodium carbonate, 4 grams of potassium bromide and 0.3 gram of benztriazole.

(2) Washing with water for 5 minutes.
(3) Fixation for 6 minutes in a solution of 200 grams of crystallized sodium thiosulfate and 20 grams of potassium metabisulfite in 1 liter of water.
(4) Washing with water for 5 minutes.
(5) Color bleach for 3 to 12 minutes with a solution which contains, per liter of water, 50 to 80 grams of potassium bromide, 40 to 80 grams of thiourea, 35 to 80 grams of sulfuric acid of 30% strength and, if desired, 0.001 gram of 2-aminohydroxyphenazine.
(6) Washing with water for 10 minutes.
(7) Bleaching of residual silver for 5 minutes with a solution of 60 grams of crystallized copper sulfate, 80 grams of potassium bromide and 15 ml. of hydrochloric acid of 30% strength in one liter of water.
(8) Washing with water for 5 minutes.
(9) Fixation for 5 minutes in the manner indicated under 3.
(10) Washing with water for 5 minutes.

A true positive image to be viewed in incident light and which is resistant to light is obtained.

The magenta dyestuffs of the Formulae 10 to 25 can be incorporated in the green-sensitized layer instead of the dyestuff of the Formula 1, and similar good results are obtained thereby.

What is claimed is:
1. Photographic material for the silver dyestuff bleaching process which contains in one silver halide layer at least one dyestuff of the formula

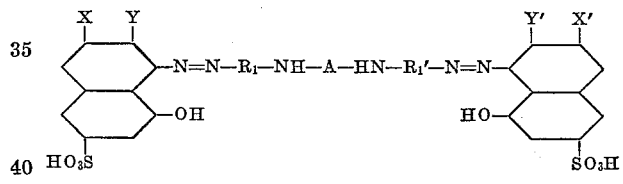

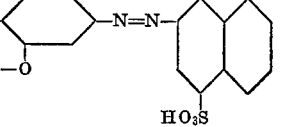

in which X and X' each represents a member selected from the group consisting of a hydrogen atom and a sulfonic acid group, Y and Y' each represents a member selected from the group consisting of a phenylamino-group further substituted by alkyl groups in the two positions vicinal to the bond with the nitrogen atom, an alkylamino group, a hydroxyalkylamino group having at least two carbon atoms and a cycloalkylamino group, $R_1$ and $R_1'$ each represents a cyclic radical containing at least one benzene ring to which the azo group is attached, and A represents a member selected from group consisting of the radical of the formula —CO— and the diacyl radicals of benzene-, theophene- and furandicarboxylic acid and cyanuric acid.

2. Photographic material as claimed in claim 1 which contains silver halide and a dyestuff of the formula

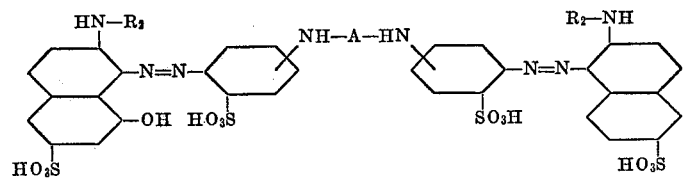

in which $R_2$ represents a phenylamino group further substituted by methyl groups in the phenyl radical at least in the two positions vicinal to the bond with the nitrogen atom, A represents a member selected from group consisting of the radical of the formula —CO— and the diacyl radicals of benzene-, thiophene- and furan-dicarboxylic acid and cyanuric acid, and $n$ represents an integer not greater than 2.

3. Photographic material as claimed in claim 1 which contains silver halide and a dyestuff of the formula

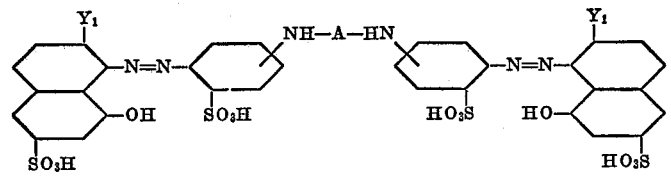

in which $Y_1$ represents a member selected from the group consisting of an alkylamino group, a hydroxyalkylamino group each having at least two carbon atoms and a cycloalkylamino group. A represents a member selected from group consisting of the radical of the formula —CO— and the diacyl radicals of benzene-, thiophene- and furan-dicarboxylic acid and cyanuric acid, and $n$ represents an integer not greater than 2.

4. Photographic material as claimed in claim 1 which contains silver halide and a dyestuff of the formula

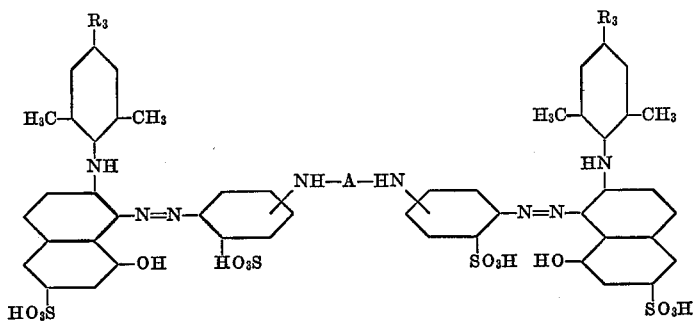

in which A represents a member selected from group consisting of the radical of the formula —CO— and the diacyl radicals of benzene-, thiophene- and furan-dicarboxylic acid and cyanuric acid, and $R_3$ represents a member selected from the group consisting of a hydrogen atom and a methyl group.

5. Photographic material as claimed in claim 1 which contains silver halide and the dyestuff of the formula

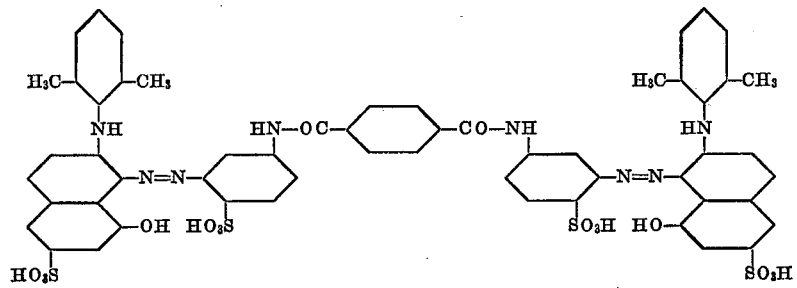

6. Photographic material as claimed in claim 1, which contains the dyestuff of the formula
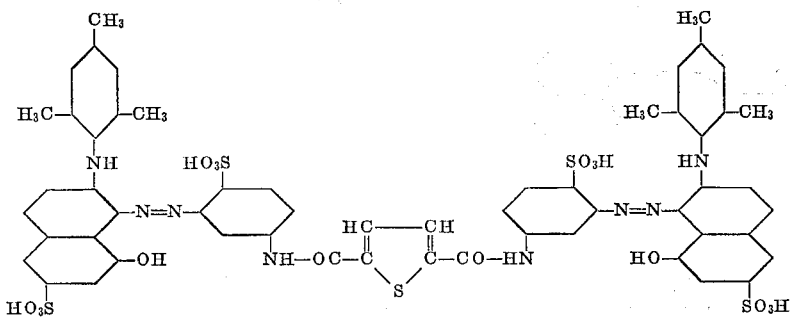
7. Photographic material as claimed in claim 1, which contains the dyestuff of the formula
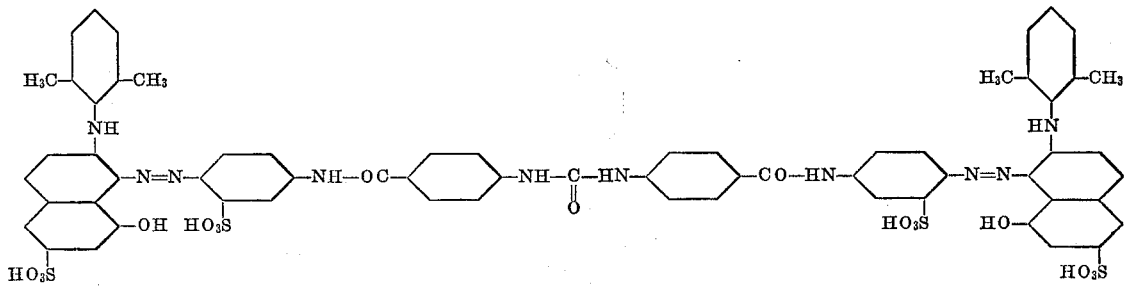
References Cited
UNITED STATES PATENTS
3,211,554   10/1965   Dreyfuss _____ 96—99
J. TRAVIS BROWN, *Primary Examiner.*
U.S. Cl. X.R.
96—20, 53, 73

CERTIFICATE OF CORRECTION

Patent No. 3,454,402          Dated   July 8, 1969

Inventor(s)   WALTER ANDERAU ET AL

It is certified that error appears in the above-identified patent and that said Letters Patent are hereby corrected as shown below:

Column 13, the formula, after line 2, should appear as follows:

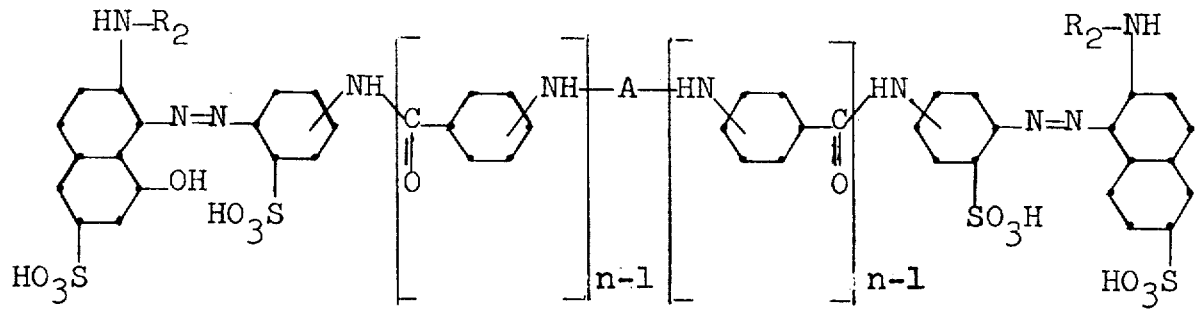

Column 13, the formula, after line 44, should appear as follows:

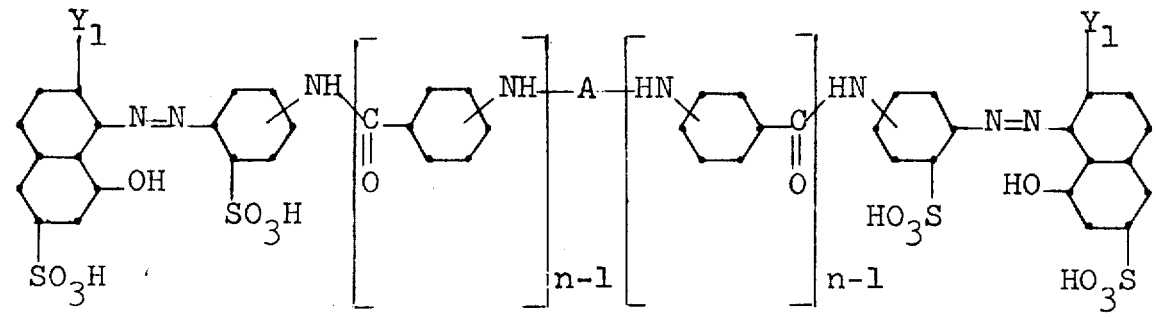

Signed and sealed this 17th day of August 1971.

(SEAL)
Attest:

EDWARD M. FLETCHER, JR.
Attesting Officer

WILLIAM E. SCHUYLER, JR.
Commissioner of Patents